United States Patent
Handwerker

[11] Patent Number: 5,874,150
[45] Date of Patent: Feb. 23, 1999

[54] HEAT RETAINING BLANKET WITH INSULATING MEDIA FASTENED AT TOP AND BOTTOM AND METHOD FOR MAKING

[76] Inventor: Gary Handwerker, 2311 Burr Oak Rd., Northfield, Ill. 60093

[21] Appl. No.: 804,368

[22] Filed: Feb. 21, 1997

[51] Int. Cl.⁶ .................................................. B32B 3/12
[52] U.S. Cl. ................................. 428/102; 52/3; 52/63; 428/68; 428/75; 428/76; 428/124; 428/126; 428/174; 428/192
[58] Field of Search ................................ 428/102, 192, 428/68, 74, 75, 76, 124, 126; 52/3, 63

[56] References Cited

U.S. PATENT DOCUMENTS

| | | | |
|---|---|---|---|
| 3,199,481 | 8/1965 | Handwerker | 428/102 |
| 4,590,714 | 5/1986 | Walker | 428/74 |
| 4,892,771 | 1/1990 | Rowland | 428/74 |
| 5,224,832 | 7/1993 | Gonczy | 112/262.1 |
| 5,549,956 | 8/1996 | Handwerker | 428/73 |

*Primary Examiner*—Nasser Ahmad
*Attorney, Agent, or Firm*—Sonnenschein Nath & Rosenthal

[57] ABSTRACT

A heat insulating blanket with insulating media fastened at top and bottom of the blanket. The method for making the heat reflecting blanket comprises the steps of providing a first moisture-impervious outer layer having top and bottom edges, providing a second moisture-impervious outer layer having top and bottom edges, arranging at least one layer of insulating material between the first and second outer layers and in a confronting relationship therewith, folding the first and second outer layers with the insulating material therebetween into hems at the top and bottom edges, and securing the hems to form a heat insulating blanket with insulating media fastened at top and bottom. In another aspect of the invention, a heat insulating blanket with insulating media fastened at top and bottom is also described.

10 Claims, 3 Drawing Sheets

HEAT RETAINING BLANKET WITH INSULATING MEDIA FASTENED AT TOP AND BOTTOM AND METHOD FOR MAKING

FIELD OF THE INVENTION

This invention is related to multilayer heat retaining and/or reflective blankets, and more particularly to a heat retaining blanket used for curing concrete and like materials, and is more particularly directed toward a heat retaining blanket with internal insulating media fastened to exterior portions of the blanket at the top and bottom of the blanket.

BACKGROUND OF THE INVENTION

During the concrete curing process, chemical changes occur in the presence of water which ensure that the hardened concrete will be water-tight and durable. These chemical changes occur over a considerable period of time requiring that the concrete be kept wet during the curing period. The heat radiating from the concrete during the curing process evaporates the moisture in the concrete, inhibiting the chemical hardening process and compromising the strength and durability of the cured concrete. It is therefore necessary to contain the heat and moisture in the concrete long enough to permit the curing process to be sufficiently completed. The need for heat and moisture retention increases during cold weather applications. One prior art approach to solve this problem is taught by U.S. Pat. No. 5,549,956 to Handwerker titled "Heat Reflective Blanket" which is directed to a flexible, multilayer heat reflective blanket.

When curing concrete wall structures, the curing blanket must be disposed vertically, in an orientation parallel to the wall surface being cured. When a heat retaining blanket is disposed in this vertical orientation, the internal insulating media have a tendency to settle toward the bottom of the blanket. This tendency to settle is exacerbated by windy conditions or rough handling that might tend to jostle the blanket.

To overcome this settling tendency, blankets of the prior art often employ a plurality of fasteners to secure the internal insulating media to exterior portions of the heat retaining blanket. Although this process is adequate to secure the insulating media in place, the fasteners add to the material cost of the reflecting blanket and time (and possible machinery) involved in inserting the fasteners adds to the labor cost in fabricating a heat retaining blanket, thus resulting in higher costs to the consumer.

In addition, the fasteners are subject to breakage under the conditions that generally obtain at a construction site. Breakage of the fasteners can lead to slippage of the internal insulating media, thus compromising the effectiveness of the blanket in curing concrete.

Accordingly, a need arises for an improved method for attaching the insulating media to the outer structure of the heat retaining blanket, and an improved blanket constructed in accordance with the method. The improved blanket should be relatively inexpensive to manufacture and should exhibit enhanced durability so that it will function dependably over an extended product lifetime in the construction environment.

SUMMARY OF THE INVENTION

These needs and others are satisfied by the method of the present invention for making a heat retaining blanket with insulating media fastened at the top and bottom of exterior portions to the blanket. The method comprises the steps of providing a first moisture-impervious outer layer having top and bottom edges, providing a second moisture-impervious outer layer having top and bottom edges, arranging at least one layer of insulating material between the first and second outer layers and in a confronting relationship therewith, folding the first and second outer layers with the insulating material therebetween into hems at the top and bottom edges, and securing the hems to form a heat reflecting blanket with insulating media fastened at the top and bottom to the outer layers.

The steps of providing first and second moisture-impervious outer layers may comprise providing first and second outer layers of substantially the same size, the layers formed from woven polyethylene material. In one form of the invention, each of the outer layers may further include an aluminum reflective coating on one surface and an opaque polyethylene coating on the opposite surface.

The step of arranging at least one layer of insulating material between the first and second outer layers comprises arranging the at least one layer of insulating material between first and second outer layers of substantially the same size, and wherein the layer of insulating material is substantially the same size as the first and second outer layers.

The step of folding the first and second outer layers with the insulating material therebetween comprises folding the first and second outer layers to define a folded region and maintaining the insulating material therebetween throughout the folded region. In one aspect of the invention, the step of folding the first and second outer layers with the insulating material therebetween comprises folding the first and second outer layers once to form a single fold. In another aspect, the step of folding the first and second outer layers with the insulating material therebetween comprises folding the first and second outer layers twice to form a double fold.

The step of securing the hems may comprise sewing the hems to secure the insulating media, and the hems may be sewn with a plurality of rows of substantially parallel stitches. In the alternative, the step of securing the hems may comprise gluing the hems. A plurality of spaced apart grommets may also be applied along the hem to secure it.

In yet another aspect of the invention, a heat retaining blanket with insulating media fastened at top and bottom comprises a first moisture-impervious outer layer having top and bottom edges, a second moisture-impervious outer layer having top and bottom edges, at least one layer of insulating material disposed between the first and second outer layers and in a confronting relationship therewith, top and bottom hems formed proximate the top and bottom edges respectively by folding the first and second outer layers with the insulating material therebetween, and means for securing the hems to form a heat retaining blanket with insulating media fastened at the top and bottom.

Further objects, features, and advantages of the present invention will become apparent from the following description and drawings.

DETAILED DESCRIPTION OF THE INVENTION

In accordance with the present invention, a heat retaining blanket is described that provides distinct advantages when compared to those of the prior art. The invention can best be understood with reference to the accompanying drawing figures.

Figure 1:
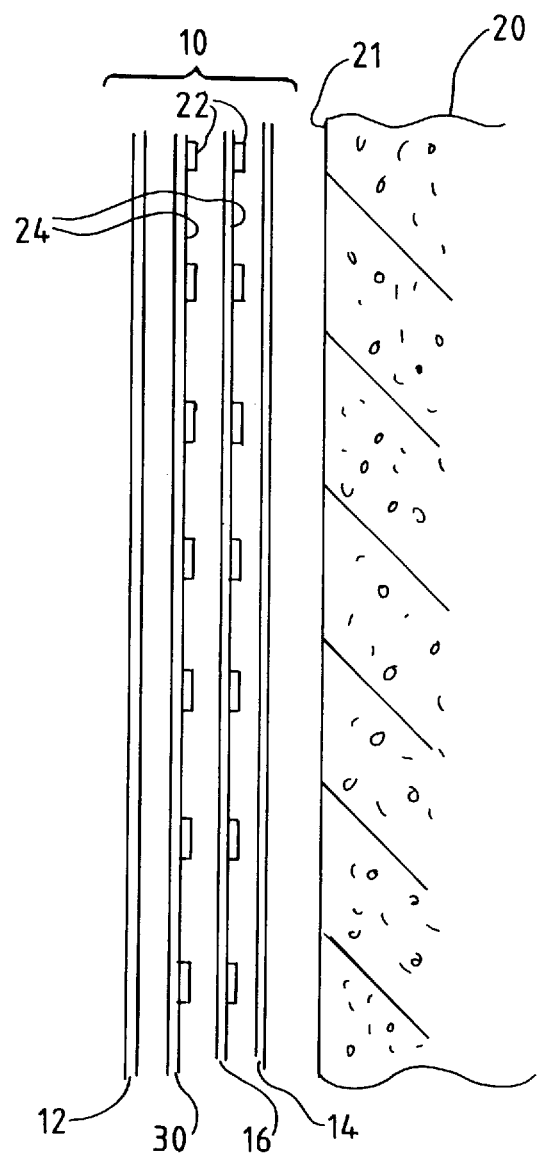
FIG. 1 is a side section view of a portion of a heat retaining blanket in accordance with the present invention draped adjacent a concrete wall section.

FIG. 1 is a side partial sectional view of a heat retaining blanket 10 in accordance with the present invention disposed adjacent a recently poured concrete wall 20. The heat retaining blanket 10 comprises first and second outer layers 12, 14 which enclose first and second heat insulative layers 16, 30. Outer layer 14 is disposed immediately adjacent the concrete wall structure 20. The outer layers 12, 14 are preferably constructed of plastic compounds such as polyethylenes, polyesters, cellophanes and like moisture-impervious materials which protect the interior insulative layers 16, 30 from environmental conditions existing outside the blanket 10. The outer layers 12, 14 may also be constructed of other moisture-impervious materials, such as waterproofed canvas or other suitable fibrous materials. Besides functioning as moisture barriers, the outer layers 12, 14 are constructed of materials that do not adhere to the curing concrete 20 and have relatively smooth outer surfaces so as not to leave any marks or impressions on the concrete surface 21. In a preferred embodiment the outer layers are constructed of fire resistant materials to promote safety on the construction work site where flame heaters may be used to provide additional heat for the concrete curing process especially during colder days.

Additionally, the outer layers 12, 14 are constructed of materials that are not subject to bacterial degradation from contact with the chemicals present in the concrete slab 20 during the curing process, resulting in a blanket that is effectively reusable, long-lasting and inherently more cost effective than existing insulation blankets or existing heat reflective blankets.

The insulative layers 16, 30 are preferably constructed of air filled pockets 22 or like insulative elements, as illustrated, preferably in one-quarter and one-half inch thicknesses. The thickness of the insulative layer 16 may vary according to the blanket's purpose. The insulative air pockets or elements 22 are disposed in spaced relation to each other on the surfaces of the insulative layer 16, 30 defining open spaces 24 between them. In one embodiment of the invention, the insulative layers 16, 30 may include heat reflective elements, such as aluminum fragments, dispersed throughout the surfaces thereof. This construction provides heat reflective qualities to the blanket 10 in addition to the insulative qualities mentioned previously. Accordingly, in this latter embodiment the heat reflective insulative layers 16, 30 serve a dual purpose along their length and width (e.g., the combination of the air pockets and the open spaces), namely, to reflect radiating heat originating from the surface (or other point of origination) back to the surface (or point of origination), and to constitute an effective insulation barrier (as a result of the air filled pockets or elements) for the blanket.

Each of the outer layers is preferably formed from a woven polyethylene fabric in which columns of polyethylene strips approximately 0.375 inch in width are interlaced with rows of transversely disposed strips. The resulting structure is strong, flexible, and light in weight. To complete the structure of the outer layers in a preferred embodiment, one surface of each layer (preferably the surface facing toward the concrete to be cured) is coated with aluminum to enhance the heat reflective properties of the blanket, and a translucent (or transparent, if desired) layer of polyethylene film is deposited on top of the aluminum to protect the coating. On the opposite side of the woven polyethylene fabric, an opaque layer of polyethylene is deposited.

Figure 2:
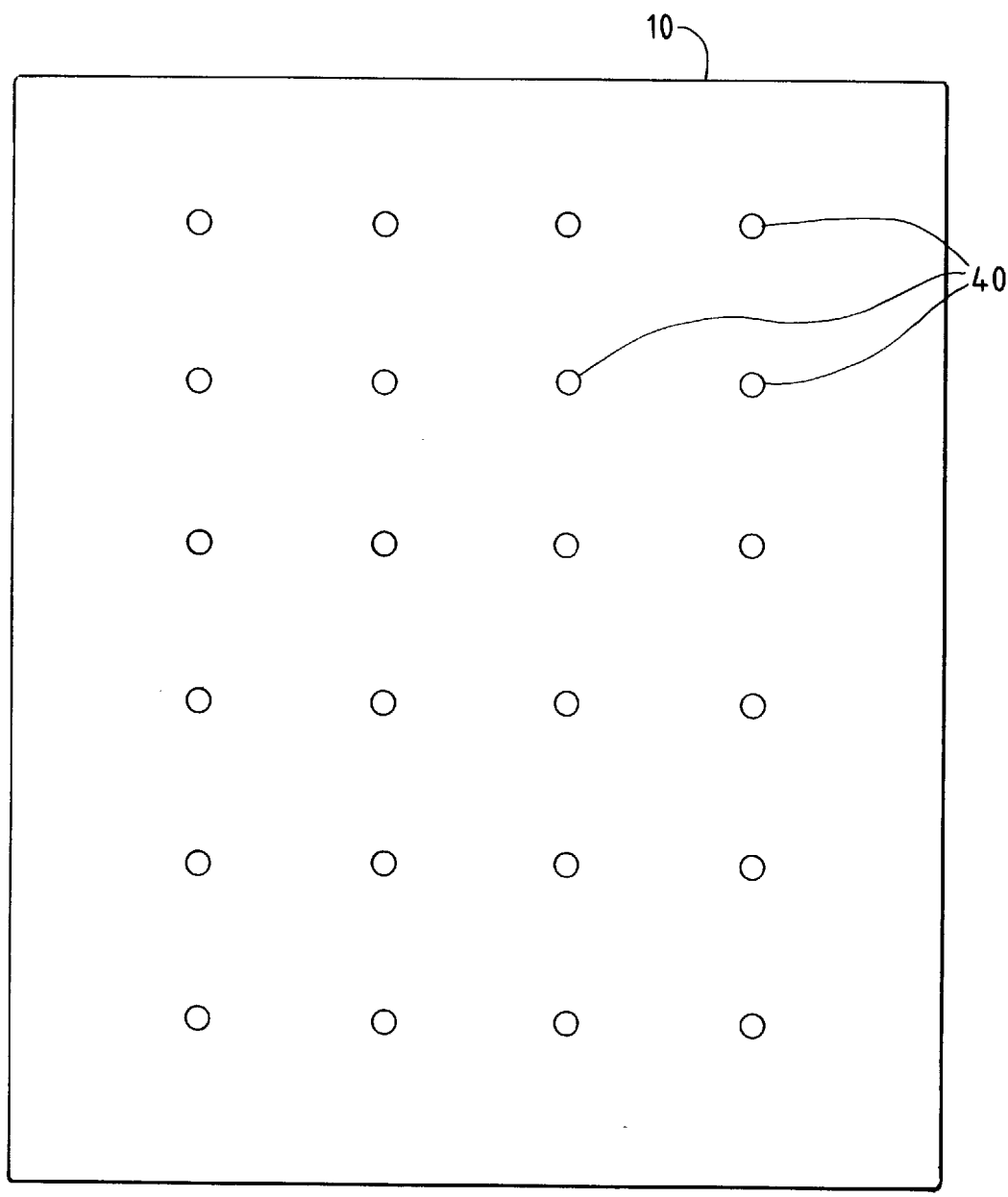
FIG. 2 is a top plan view of a heat retaining blanket of the prior art.
Figure 3:
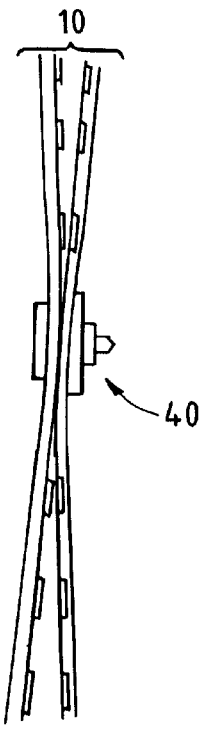
FIG. 3 is a side section view of a heat retaining blanket of the prior art, illustrating a prior art insulation media fastening technique.

FIG. 2 illustrates a heat insulating blanket 10 constructed in accordance with the prior art, in which a plurality of fasteners 40 are used to hold the internal insulating layers or media 16, 30 in place. FIG. 3 is a side section view illustrating the fashion in which the fastener 40 is driven through the material of the blanket 10.

Figure 4:
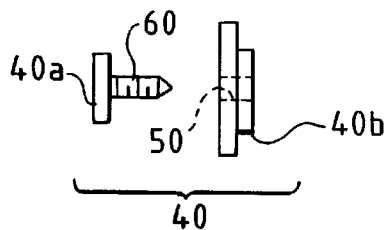
FIG. 4 illustrates, in side elevational view, an insulating media fastener of the prior art.

FIG. 4 depicts the construction of the fastener 40. Typically, the fastener 40 has a first section 40a that is shaped much like a conventional nail and serves a similar function. However, the fastener 40 used in prior art blankets is typically made from nylon or some other suitable plastic. The nail-like head portion 40a is driven through the blanket 10 so that it pierces both outer layers and the insulating layers in the interior of the blanket. A cap 40b is then applied to prevent the head 40a from backing out of the material. Typically, the cap 40b is also constructed of a plastic material, such an nylon, and is provided with features (not shown) in the interior of a through-hole 50 that grasp corresponding features on the shank 60 of the head portion to prevent the fastener from being easily dislodged.

As discussed previously, the nylon fasteners 40 of the prior art are disadvantageous for a number of reasons. To overcome these disadvantages, a less costly and structurally more sound method has been devised. In assembling a heat reflective blanket in accordance with the present invention, the interior insulating layers or insulating media 16, 30 are cut to substantially the same size as the outer layers 12, 14 of the blanket 10. In reflective blankets of the prior art, the layers of interior insulating media are always cut smaller than the outer layers.

Figure 5:
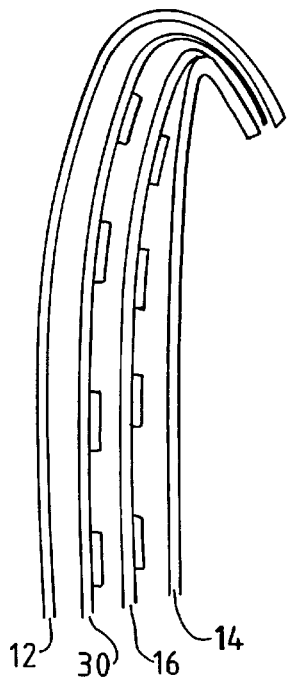
FIG. 5 is a side section view of a portion of a heat retaining blanket in accordance with the present invention, illustrating a folded region.

Once the layers of material for assembly of the insulating blanket have been cut, they are placed one on top of the other in appropriate registration, as shown in the side section view of FIG. 5, and folded over together as illustrated. The layers of material may be folded either once or twice as desired.

Figure 6:
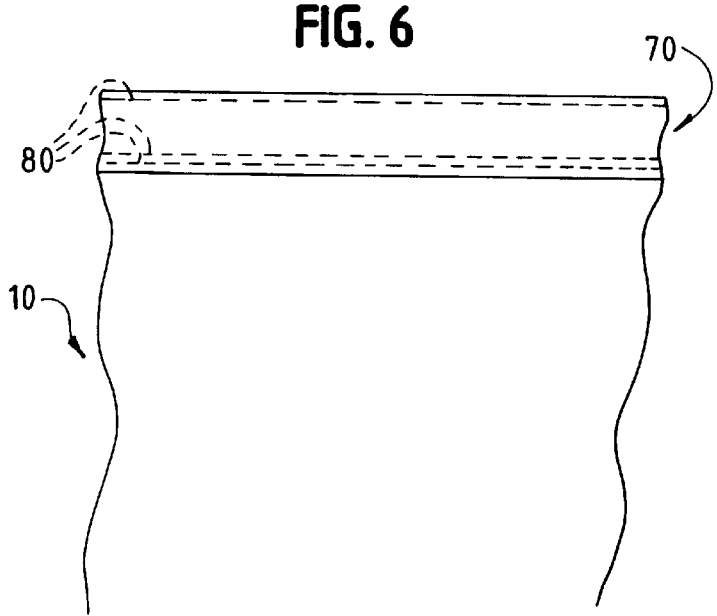
FIG. 6 is a top plan view of a portion of a heat retaining blanket in accordance with the present invention showing a hem formed proximate one edge of the blanket.

After folding into a hem 70 as shown in FIG. 6, all of the layers of the blanket 10 are stitched together by sewing 80 with a thread or filament of appropriate strength. Of course, the hem area 70 may also be secured by internal and external gluing, or by inserting a plurality of grommets or other fasteners, but stitching along the hem area is a cost-effective and robust way to adhere the hem region such that the finished product will exhibit superior structural integrity and performance in harsh environments.

There has been described herein a heat reflective blanket that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A heat insulating blanket with insulating media fastened at top and bottom of the blanket comprising:

a first moisture-impervious outer woven polyethylene layer having top and bottom edges;

a second moisture-impervious outer woven polyethylene layer having top and bottom edges;

at least one layer of insulating material disposed between the first and second outer layers and in a confronting relationship therewith;

top and bottom hems formed proximate the top and bottom edges respectively by folding the first and second outer layers with the insulating material therebetween; and means for securing the hems to form a heat reflecting blanket with insulating media fastened at top and bottom of the blanket.

2. The heat insulating blanket of claim 1, wherein each of the outer layers further includes an aluminum coating on one surface of the woven polyethylene material and an opaque polyethylene coating on the opposite surface of the woven polyethylene material.

3. The heat insulating blanket of claim 1, wherein the first and second outer layers comprise layers of substantially equal size, and wherein the layer of insulating material is substantially the same size as the first and second outer layers.

4. The heat insulating blanket of claim 1, wherein the top and bottom hems define folded regions in which said at least one layer of insulating material is maintained between the first and second outer layers throughout the folded region.

5. The heat insulating blanket of claim 4, wherein the folded region comprises a region in which the first and second outer layers, with said at least one insulating layer therebetween, are folded once to form a single fold.

6. The heat insulating blanket of claim 4, wherein the folded region comprises a region in which the first and second outer layers, with said at least one insulating layer therebetween, are folded twice to form a double fold.

7. The heat insulating blanket of claim 1, wherein the means for securing the hems comprises means for sewing the hems to secure the insulating media.

8. The heat insulating blanket of claim 7, wherein the means for sewing the hems comprises means for sewing the hems with a plurality of rows of substantially parallel stitches.

9. The heat insulating blanket of claim 1, wherein the means for securing the hems comprises means for gluing the hems.

10. The heat insulating blanket of claim 1, wherein the means for securing the hems comprises means for applying a plurality of spaced apart grommets along at least one hem.

* * * * *